Jan. 20, 1942.                R. S. DRUMMOND                 2,270,831
                           GEAR FINISHING MACHINE
                      Filed April 5, 1937          9 Sheets-Sheet 1

FIG. I.

INVENTOR
ROBERT S. DRUMMOND
BY
*Whittemore Hulbert & Belknap*
ATTORNEYS

Jan. 20, 1942.  R. S. DRUMMOND  2,270,831
GEAR FINISHING MACHINE
Filed April 5, 1937  9 Sheets-Sheet 2

INVENTOR
ROBERT S. DRUMMOND
BY
ATTORNEYS

Jan. 20, 1942.    R. S. DRUMMOND    2,270,831
GEAR FINISHING MACHINE
Filed April 5, 1937    9 Sheets-Sheet 3

FIG.3.

INVENTOR
ROBERT S. DRUMMOND
BY Whittemore Hulbert Belknap
ATTORNEYS

Jan. 20, 1942.　　　R. S. DRUMMOND　　　2,270,831
GEAR FINISHING MACHINE
Filed April 5, 1937　　　9 Sheets-Sheet 4

*INVENTOR*
ROBERT. S. DRUMMOND
BY *Whittemore Hulbert + Belknap*
*ATTORNEYS*

Jan. 20, 1942.  R. S. DRUMMOND  2,270,831
GEAR FINISHING MACHINE
Filed April 5, 1937  9 Sheets-Sheet 6

INVENTOR
ROBERT S. DRUMMOND
BY
Whittemore Hulbert + Belknap
ATTORNEYS

Jan. 20, 1942.　　　R. S. DRUMMOND　　　2,270,831
GEAR FINISHING MACHINE
Filed April 5, 1937　　　9 Sheets-Sheet 7

FIG. 16.

INVENTOR
ROBERT. S. DRUMMOND
BY
Whittemore Hulbert & Belknap
ATTORNEYS

Jan. 20, 1942. R. S. DRUMMOND 2,270,831
GEAR FINISHING MACHINE
Filed April 5, 1937 9 Sheets-Sheet 8

INVENTOR
ROBERT. S. DRUMMOND.
BY Whittemore Hulbert & Belknap
ATTORNEYS

Jan. 20, 1942.   R. S. DRUMMOND   2,270,831
GEAR FINISHING MACHINE
Filed April 5, 1937   9 Sheets-Sheet 9

INVENTOR
ROBERT. S. DRUMMOND.
BY
Whittemore Hulbert & Belknap
ATTORNEYS

Patented Jan. 20, 1942

2,270,831

UNITED STATES PATENT OFFICE 2,270,831

GEAR FINISHING MACHINE

Robert S. Drummond, Detroit, Mich.

Application April 5, 1937, Serial No. 135,184

7 Claims. (Cl. 90—1.6)

The present invention relates to gear finishing and more particularly to apparatus and methods for simultaneously performing a plurality of operations on one or more gears. Specifically, the invention pertains to an application of the principles described in my co-pending applications Serial No. 3,662, filed January 26, 1935, and Serial No. 52,566, filed December 2, 1935, wherein gears are finished by employing rotary cutting tools having conjugate teeth intermeshing with the teeth of the gear to be finished, the axes of the gear and tool being crossed at an angle varying from 3° to 30°.

In each of the applications referred to, there are shown one gear and one cutter, the latter being driven and, because of its intermeshing relation with the gear, thereby rotating the work piece. At the same time a relatively reciprocating motion of the gear and tool is effected, either by moving the gear back and forth with respect to the tool, or vice versa. It is understood of course, that this reciprocation takes place co-incidentally with rotation of the gear and tool. The sides of the gear teeth are thus cut or shaved evenly and when finished have surfaces which are smooth and extremely accurate with regard to dimensions.

It has been found that it is possible and desirable under certain circumstances to perform a plurality of operations simultaneously on one gear by tools spaced from each other circumferentially with respect to the gear. Certain roughing or primary finishing operations may, for instance, be carried out on one portion of the gear immediately prior to the final finishing operation without necessitating removal of the gear from the finishing machine. Also, a plurality of gears are frequently secured to or formed integral with a shaft or sleeve such, for instance, as so-called "cluster gears," and it is desirable to finish more than one of the gears simultaneously by suitably positioned tools acting on the several gears.

It is an object of this invention to provide a machine capable of performing a plurality of operations simultaneously but with a single work drive mechanism, thus eliminating mechanical and timing difficulties, yet effectively and accurately finishing a gear or a plurality of gears.

It is another object of the invention to provide separate and independent means for effecting relative reciprocating motion between the tools and the work gear or gears.

It is also an object of the invention so to position the cutting tools circumferentially with respect to the work gear that operating pressures will be more nearly equalized and balanced.

Still another object of the invention is to provide means for initially setting the tools with respect to the work piece and additional means for moving the tools quickly toward or away from engagement with the work after said initial setting. Other objects will be apparent from the following description taken with the accompanying drawings, in which.

Figure 1:
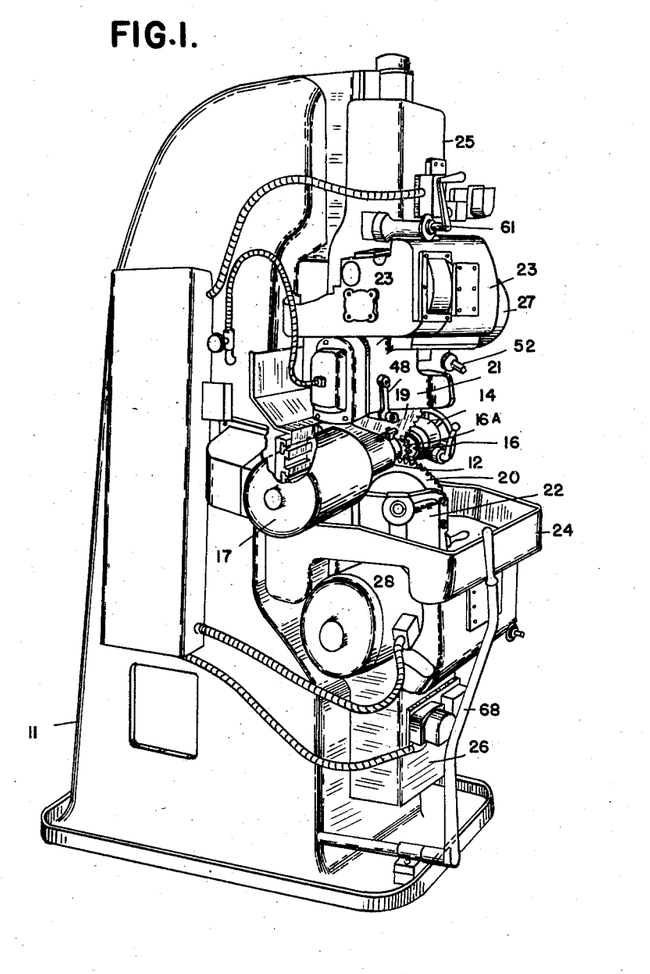
Fig. 1 is a perspective of a machine showing a preferred arrangement and relation of the finishing tools and driving mechanism.
Figure 9:
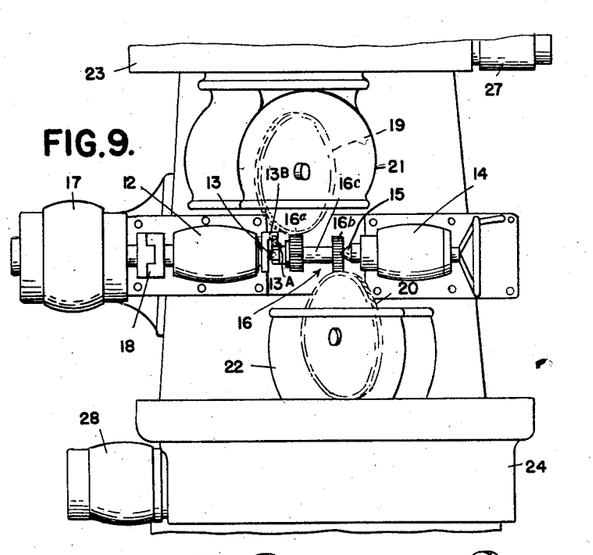
Fig. 9 is a partial front elevation of the machine, certain parts thereof being omitted for clearness.

As shown in Figs. 1 and 9, the machine consists of a frame or base 11 having a bearing 12 in which is journaled a spindle or shaft 13 and a tailstock 14 provided with center 15. It will be seen that the spindle and tailstock are relatively adjustable with respect to each other and that a work piece, such as the cluster gear 16, comprising axially aligned gears 16ª, 16ᵇ formed integral with hollow shaft 16ᶜ, may be clamped therebetween. A driving motor 17 through a driving coupling 18 rotates the shaft 13 which has a driving flange 13B engaging the driving dog 13A on the cluster gear 16.

Mounted on the frame for adjustment transversely with respect to the axis of the work, which in the type of machine illustrated is a vertical adjustment, are cutting tools 19 and 20. As shown in the drawings, these tools are positioned substantially diametrically opposite each other with respect to the work gear, but it is within the invention broadly to position them otherwise if so desired. Each of the tools is journaled in a housing, the latter being indicated at 21 and 22, and the axes of the cutters are disposed at an angle to that of the shaft 13. The tools are gear like and similar to those shown in the co-pending applications to which reference has previously been made herein. By driving the tool, the work is rotated by intermeshing engagement of the teeth on the tool and work gear. The tool housings are secured to reciprocable carriages 23, 24 respectively, and, as will be explained hereinafter, are angularly adjustable thereon. These carriages are mounted in suitable ways 54 (see Fig. 6) on heads 25, 26, the ways being disposed parallel to the axis of the work. The heads in turn are adjustably fixed on ways within the frame. Reciprocating mechanisms driven by motors 27, 28, are connected to the carriages whereby the latter are moved back and forth with respect to the work gear during the gear finishing operations. It is to be noted that the reciprocating carriages and the driving mechanisms therefor are independent of each other, and are adapted to be controlled separately so that any desired relative movement of the carriages with respect to the work, either with regard to length of stroke or speed, is obtainable. Furthermore, each tool housing is adjustable angularly to vary the relative angle between the axes of each other and that of the work.

Figures 2, 14, 15:
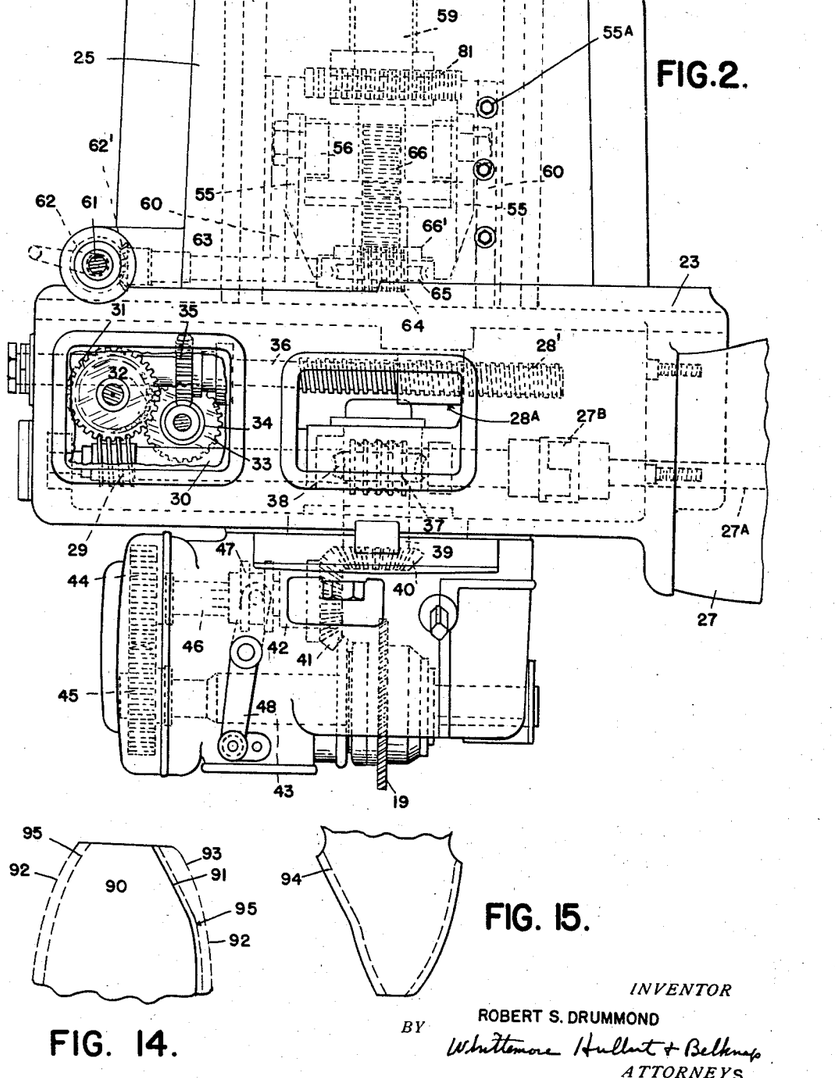
Fig. 2 is a front view of one tool head and carriage, parts thereof being broken away for clearness.
Fig. 14 is a diagram illustrating the method of finishing a gear tooth having a severe modification.
Fig. 15 is a diagrammatic view of roughing and finishing cutters for carrying out the method of Fig. 14.
Figure 3:
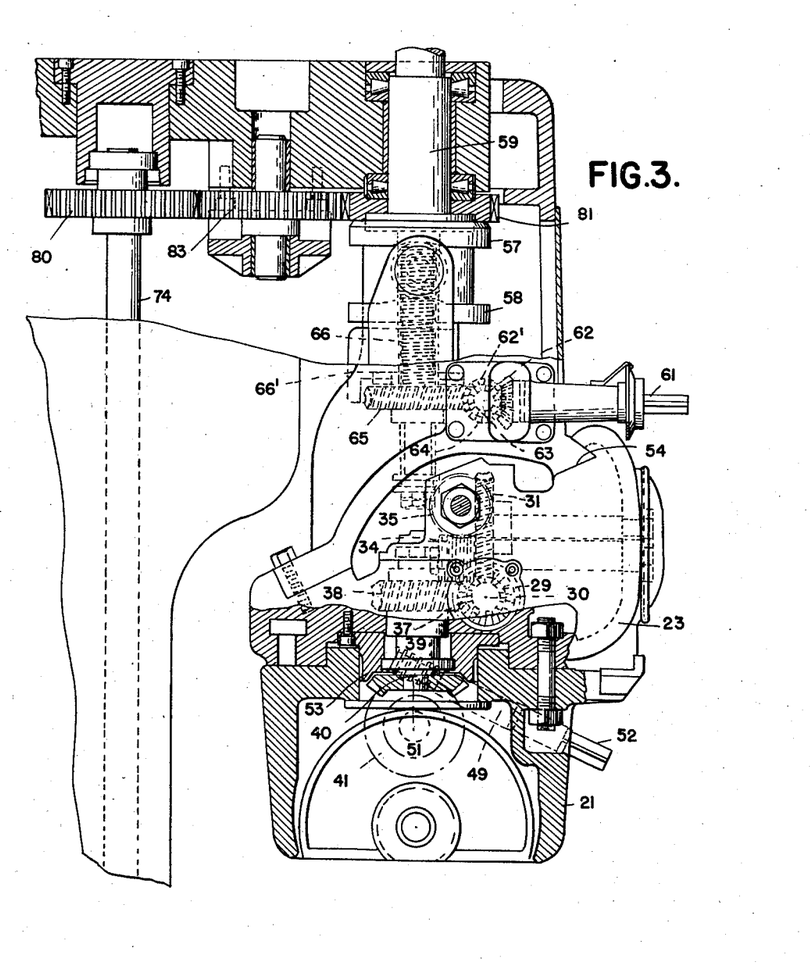
Fig. 3 is a side view of the head and carriage shown in Fig. 2, certain parts thereof being broken away and others being shown in section.
Figure 4:
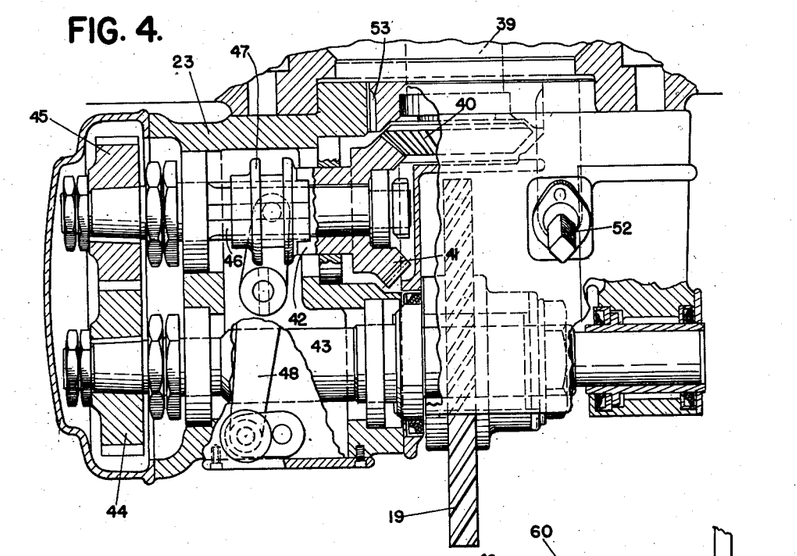
Fig. 4 is a front view, partly in section, of a clutch and gearing associated with a tool for driving the same.
Figures 5, 8:
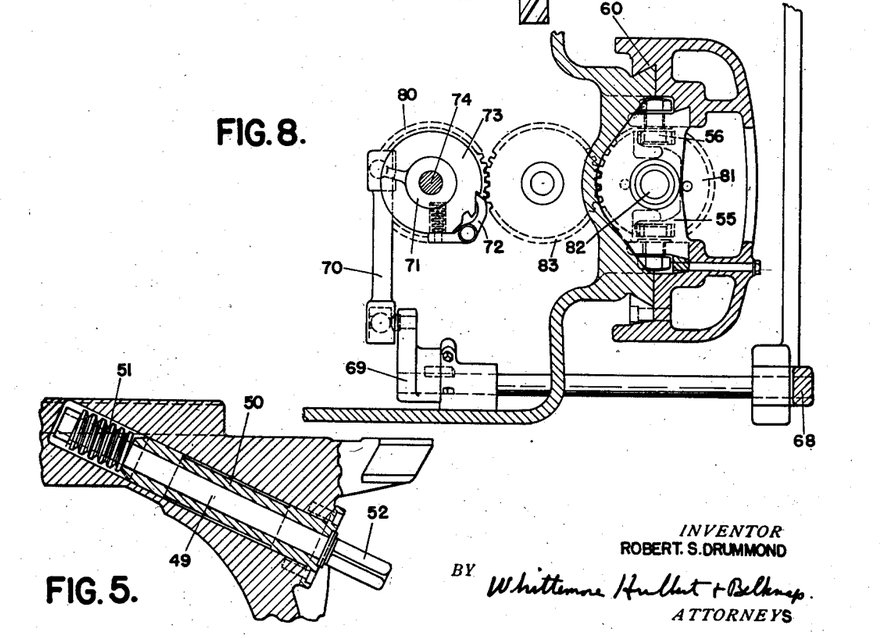
Fig. 5 is a detail of means for setting a tool angularly with respect to the work.
Fig. 8 illustrates one means for actuating the mechanism shown in Fig. 6.

Certain details of the machine will now be described and explained. As will be seen from Fig. 2, the shaft 27A of the motor 27 is connected to shaft 30 by a coupling 27B. A worm 29 on shaft 30 drives worm gear 31. Gear 32 coaxial with gear 31 meshes with gear 33 and the coaxial worm 34 drives worm gear 35 on the shaft 36. This shaft is threaded to form a lead screw 28' which cooperates with a nut 28A on the head 25. Suitable reversing or limit switches properly spaced and positioned on the frame are adapted to reverse the direction of the motor at predetermined intervals so that the carriage and finishing tool carried thereby are moved back and forth in the direction of the gear axis. It is to be noted, however, that in addition to its reciprocating movement, each finishing tool is rotated either through intermeshing engagement with the work gear when the latter is driven, as by motor 17, or by clutch means connecting the tool with the motor, in which case the gear is driven from the tool. One manner of driving the finishing tool from the motor 27 is shown in Figs. 2 and 4, wherein it will be seen that worm 37 on shaft 30 drives worm gear 38 on shaft 39. On the latter shaft is a bevel gear 40 meshing with a second bevel gear 41 formed integral with clutch member 42. This tool 19 on the shaft 43 may be driven through gears 44, 45, the latter on shaft 43 and the former on splined shaft 46. A dental clutch member 47 splined on shaft 46 is slidable into engagement with the member 42, its position being controlled by lever 48. While it is preferred in many cases to drive the work gear, it is apparent that, if desired, the finishing tool may be positively driven by its own motor. The means for reciprocating carriage 24 and tool 20, and for driving the tool from its motor are identical with that for tool 19, and therefore requires no description. It has been previously stated herein that the axes of the finishing tools cross the axis of the work gear and that means are provided for varying and setting the angular relation between these axes. In Figs. 3, 4 and 5, there is shown a worm shaft 49 having a bearing 50 in the tool housing, a worm 51 being secured to the end of the shaft, the other end of which is squared at 52 to accommodate an adjusting handle. Worm 51 meshes with a toothed ring 53 fast on carriage 23 and when rotated the worm turns the tool housing about a vertical axis coincident with that of shaft 39 and passing through the tool. In this manner the tool may be set at the desired angle with respect to the axis of the work gear. After setting, suitable fastening means secure the tool in its adjusted position.

Figures 6, 7:
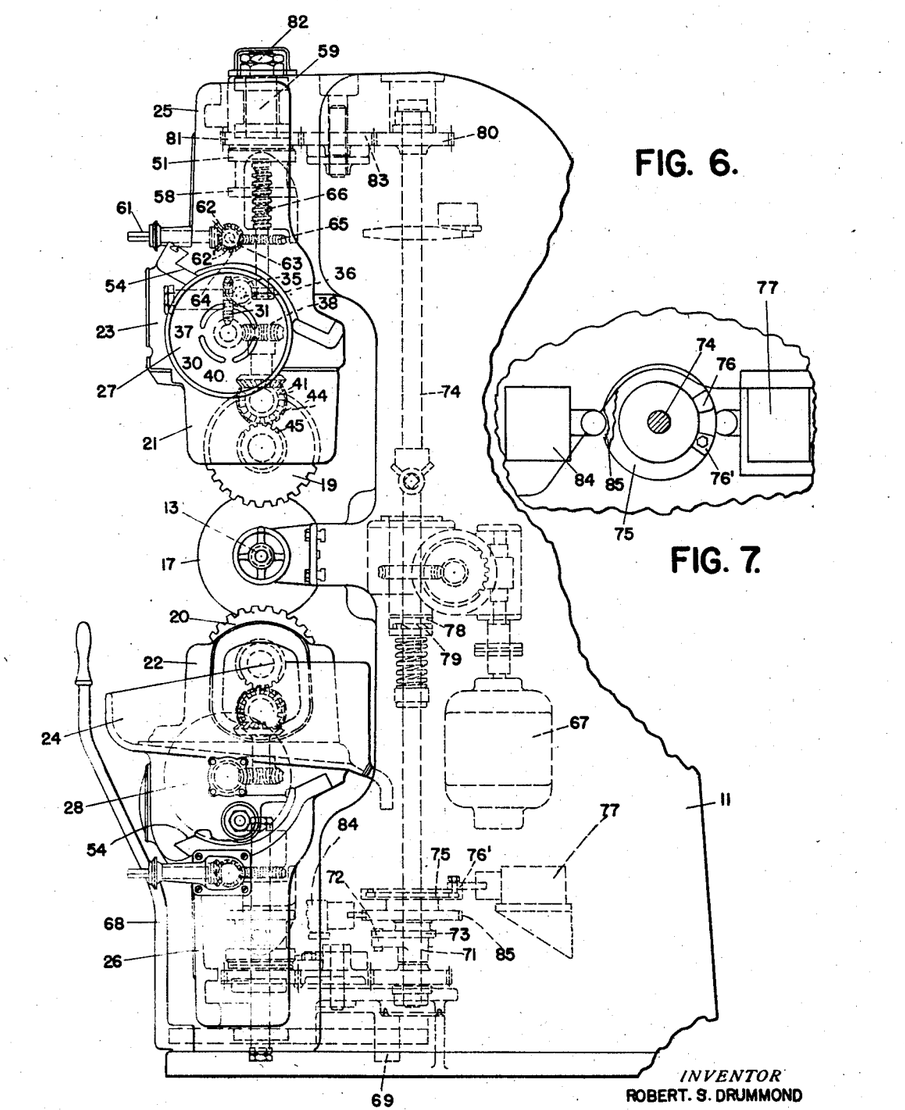
Fig. 6 is a side view of the machine, the mechanism shown being that employed for separating the tools from the work.
Fig. 7 is a partial plan view of cam mechanism controlling certain motor switches in the machine.

The means for adjusting the tool with relation to the work and separating the tools to load or remove gears from the machine are best shown in Figs. 2, 3 and 6. As previously pointed out, the tool carriages are mounted for reciprocation parallel to the axis of the work on ways 54 on the heads 25, 26. Each of the heads is carried by an auxiliary slide 55 having rollers or followers 56 thereon by means of which the slide is supported on cams 57, 58, forming part of a hanger 59 rotatably supported in the machine frame. On each auxiliary slide there are provided vertical ways 60, along which and to which the heads may be adjusted and fastened. The primary adjustment of the heads and tools is effected by turning shaft 61 having a beveled gear 62 on the end thereof meshing with a second bevel gear 62' on shaft 63. On the latter shaft is a worm 64 meshing with worm wheel 65 having a keyed connection with the threaded spindle 66. This spindle cooperates with nut 66' secured to the auxiliary slide and, since it is adjustable with respect to the head, the position of the latter relative to the hanger may be fixed to cut the gear to the proper depth. The cams on the hanger normally guide the tool heads in such a way that the tools are in finishing relation to the work gear. When it is desired to separate the heads, the cams, each of which is provided with opposed rises and dwells, are rotated to elevate the upper head and drop the lower head. After the proper adjustment is made between the cutter and the work, the auxiliary slide 55 is clamped in fixed relation to the head 25 by the clamping screws 55A. For the purpose of rotating the cams, a motor 67 is provided and its operation is dependent on movement of lever 68 at the front of the machine. Referring to Figs. 6, 7 and 8, it will be seen that by throwing the lever to one side, eccentric 69 and link 70 rotate member 71, carrying pawl 72. Ratchet 73 fastened on shaft 74 is turned to rotate disk 75, also secured to shaft 74, an amount sufficient to displace a dog 76 into position to permit actuation of the switch 77, the latter closing the motor circuit. A second switch (not shown) adjacent the front of the machine and under control of the operator starts the motor. It is to be noted that clutch members 78, 79, forming an overrunning clutch, permit a connection between lever 68 and shaft 74 but do not couple the motor 67 with shaft 74 in the initial rotation of the shaft. Gears 80 and 81 on shafts 74 and 82 and connected by idler gear 83, permit the motor 67 to rotate cams 57, 58 when the starting switch is closed and, as shown in Fig. 3, guide the tool carrying heads to feed the tools radially towards the gear. After the cams have rotated sufficiently to make the desired cut on the gear, a second dog 76' on disk 75 stops the motor. When it is desired to again separate the tools, the lever is again thrown to actuate the pawl and ratchet mechanism. Disk 75 then completes its cycle and the motor is again stopped. At this time the cams 57, 58 are again in that position where the heads are separated. It is to be noted that while the heads are separated, the motors for rotating the work and tools are inactive. In order to break the tool actuating motor circuits switch 84 actuated by a cam 85 on shaft 74 is thrown when the shaft is rotated to the position shown in Fig. 7. When the tool separating mechanism is again in normal position, the switch is closed to permit operation of the tools.

Figure 10:
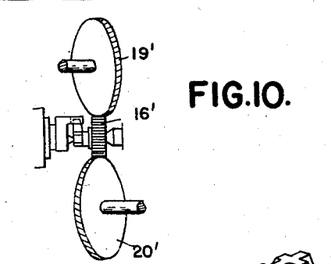
Fig. 10 is a fragmentary view of one arrangement of the work gear and finishing tools.

In Fig. 10 of the drawings there is shown diagrammatically a single gear being acted upon simultaneously by two tools 19', 20' disposed at diametrically opposite positions on the work gear 16'. These tools may be similar, that is, both of them may be like finishing tools or they may be different, one being capable of performing a primary finishing or roughing operation on the work and the other a final finishing operation. Furthermore, their respective angular positions with regard to the axis of the work, the rates of feed longitudinally of the work during rotation of the gear, and in some cases, the diameters of the cutters may be different. Because the mountings for the tools and their reciprocating mechanisms are independent of each other, it is obvious that a variety of conditions may be met without impairing the efficiency of the machine.

Figure 11:
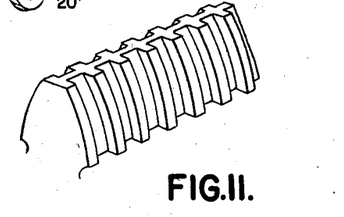
Fig. 11 is a fragmentary view of a roughing cutter showing the manner in which the cutting edges thereon are spaced.
Figure 12:
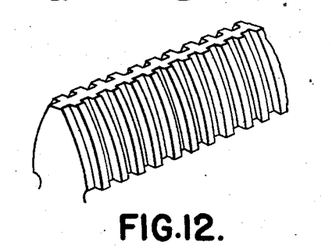
Fig. 12 is a fragmentary view of a finishing cutter illustrating the spacing of the cutting edges.

In Figs. 11 and 12 are shown examples of the tool teeth employed in roughing and finishing. The tooth shown in Fig. 11 is provided with alternate lands and recesses, but the lands are substantially less in width than the recesses. The finishing tool on the other hand is provided with teeth of the type shown in Fig. 12 and is similar to those disclosed in the co-pending applications referred to hereinbefore, wherein the lands and recesses are substantially the same width. It will thus be seen that in the roughing operation fewer cutting edges and less contact surface are presented to the work than is the case with the finishing tool. However, the roughing tool provides for greater chip clearance and less surface contact so that if desired the tool can be fed to the work at a different rate than that at which the finishing tool is fed. The primary difference between the roughing cutter and finishing cutter is that in the roughing cutter the serrations or recesses are of greater width with respect to the intermediate lands while in the finishing cutters the recesses and lands are normally of approximately equal width. The result is that the roughing cutter with its wide recesses will take heavier cuts but will not be as accurate because there is less guiding surface for maintaining accurate cutting.

Where a roughing and a finishing cutter operate simultaneously on a single gear, the roughing cutter must be set slightly ahead of the finishing cutter in the relative longitudinal movement between a tool and the work, so that it operates on the gear first and is then followed by the finishing cutter. The finishing cutter may be adjusted in either of two ways, viz.: first, it may be set at a greater depth than the roughing cutter so that it causes additional cutting or, second, it may be set at the same depth as the roughing cutter, in which case it will act to "clean up" the surface but not remove metal to a greater depth.

In the standard form of gear cutting machine, it is usual to have a certain down-set at the end of the feeding stroke in each direction, that is, the work gear is fed across the cutter and at the time its feed movement is reversed there is an automatic movement of the machine to cause the shafts to come closer together. Where the roughing cutter is acting on the work in advance of the finishing cutter, it reaches the end of its stroke first and is automatically down-fed, whereupon it starts its return stroke while the finishing cutter is still completing its movement in the first direction. In the commercial finishing of gears with both a roughing and a finishing cutter, it has been found that it is possible to completely finish a gear in four passes, that is, four complete cycles of reciprocation. When working on a gear with a roughing tool only it is usually sufficient to use only two passes while the finishing operation normally requires four passes. When operating simultaneously with both a roughing and a finishing tool, the roughing tool is down-fed at the end of each stroke for two passes and at the end of the two passes, no further down-feed is given to the roughing cutter. On the other hand, the finishing cutter is given a down-feed at each end of the stroke until four complete passes are finished. It is important to note that while the cutters remove a certain amount of metal from each side of the gear teeth during the feed movement in one direction, there is a greater amount of cutting on one side of a tooth, namely, the driving side, but in the return feed movement the opposite sides of the work teeth receive the greater amount of cutting action.

With the mechanism described herein, there are several ways of operating the machine for combined roughing and finishing. For example, there may be a down-feed at the end of each stroke; or at the end of the strokes including the down-feed a finishing cutter may continue another finishing cut in one direction, be down-fed slightly, and have a final return stroke; or again, the finishing cutter may continue for another cycle of reciprocation without any down-feed. In some circumstances it is desirable to stop the translation of the roughing cutter at the end of each stroke until the finishing cutter has caught up with it, and then start the return translation of the roughing cutter followed later by the return stroke of the finishing cutter. In other cases, the roughing cutter should be withdrawn from the work while the finishing cutter has a final cycle of reciprocation to complete the finishing operation. It may be desirable to have two roughing cuts, one in each direction, sufficient to properly rough the gear and the remainder of the finishing action is accomplished solely by the finishing cutter.

While the machine has so far been described with regard to the cutting, it is obvious that the apparatus and method outlined herein may be used for lapping and burnishing as well as cutting. Where the tools employed are lapping tools, satisfactory results are obtained by driving either the work or the tool. When cutting tools are employed, however, it has been found preferable to drive the work to obtain uniformity of cut and a better distribution of the driving force.

Figure 13:
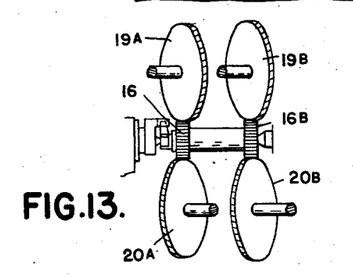
Fig. 13 is a view similar to Fig. 10 but in which a cluster gear is being finished.

In Fig. 13 a further modification of the invention is shown. In this view two axially aligned gears 16A and 16B are each acted upon by a pair of tools. Gear 16A meshes with cutters 19A and 20A, while gear 16B is acted upon by cutters 19B and 20B. The cutters may be any of the types previously described, particularly in reference to Figs. 9 and 10. The two gears need not necessarily be formed integral with the shaft but may be secured thereto by any suitable means. In principle, the method of finishing the gears is similar to that described with reference to that of the other figures of the drawings. The gears to be finished may either have spur or helical teeth. The invention is also applicable to finishing herringbone gears which are essentially two adjacent helical gears of opposite hand. The arrangements of either Fig. 9 or Fig. 13 can be used with herringbone gears.

In the several views comprising the drawings, the means for driving a gear is shown as an electrical motor, but any suitable driving means may be employed. While it is preferred that the shaft carrying the work piece be driven and the tools rotated by their intermeshing engagement with the gear, it is nevertheless apparent that the motor for reciprocating the tool carriages may be coupled to the tools when it is deemed expedient to drive the tools.

In the previous description, attention was called to the fact that the invention has an important use in connection with cluster gears, but it should be noted that it may also be used for finishing two separate gears which are mounted on a single arbor in such relation as to cooperate with the respective cutters.

It is desired to point out that when a roughing cutter of the type illustrated in Figure 11 is used for shaving, it is normal to employ a greater angle between the axis of the tool and the work than it is when a finishing cutter of the type shown in Figure 12 is used.

In connection with that feature of my invention which relates to the use of roughing cutters and finishing cutters for the work, it is desired to point out some of the advantages incident to this combination. The roughing cutters with the wider grooves between the lands mounted at a greater crossed axes relationship, will correct all of the inaccuracies in the roughed-out work gear except the involute form. The finishing cutter corrects the involute form and imparts a smoother and better surface to the work gear teeth. The roughing cutter, because of its inherent characteristics, has a longer life before it is necessary to regrind the same, and even though it does a greater percentage of the work, it is found that it will stand up better than a finishing cutter if the latter is used alone. On the other hand, where both roughing and finishing cutters are used, the finishing cutter is relieved of some of the work which it would normally do, and therefore the life of the finishing cutter is also extended. Thus the combination of the roughing and finishing cutters effects a distinct saving in tool costs, because a larger number of work pieces may be finished before regrinding is necessary.

Another advantage in the combined use of roughing and finishing cutters is found where it is necessary to place a severe modification from the involute form on the profile of the work gear teeth. In Figure 14 I have shown a gear tooth 90 having a beveled face 91 on one side of the teeth which are otherwise of substantially involute profile. In the manufacture of such a gear it is normally hobbed to approximate dimensions, as shown by the dotted lines 92, leaving sufficient stock for the final finishing operations. It is not commercially feasible to hob a profile having the beveled face 91, and therefore the contour as hobbed is of approximate involute form, thus leaving a greater amount of stock to be removed in the finishing operation between the tip portion 93 and the bevel portion 91. The roughing and finishing cutters for producing the bevel 91 are shown in Figure 15, where it will be noted that there is a flaring portion 94 which is conjugate to the bevel portion 91. The roughing cutter, because of its ability to take a heavier cut, is used to reduce the work gear to the tooth size indicated by the dotted lines 94, and it will be observed that it is necessary to remove a considerable amount of metal from the tip portion 93 in order to approximate the final tooth form 91. The finishing cutter is then employed to remove the slight amount of metal between the curves 95 and the finished tooth form 91. Assuming for example that the distance between the curve 92 and the curve 95 is approximately .002 inch, it will be observed that at the point 93 there may be removed as much as .009 inch of metal by the roughing cutter. The finishing cutter may then be used to bring the tooth to the final size and this cut is normally approximately .0005 inch.

It will be understood that the figures given above are merely by way of example to illustrate the respective functions of the roughing and finishing gear cutters. It will be clearly apparent, however, that there is a distinct advantage in combining the roughing and finishing cutters for producing a severe modification in a tooth profile as illustrated in Figure 14.

A modified form of gear finishing machine is shown in Figures 16 to 19. The modified machine differs primarily from the machine shown in Figure 1 in that provision is made for reciprocating the work-carrying slide with respect to the cutters instead of reciprocating the cutter-carrying heads. The modified machine is substantially the same in general construction as the one previously described in detail except for the provision for the reciprocation of the work-carrying slide.

Figure 16:
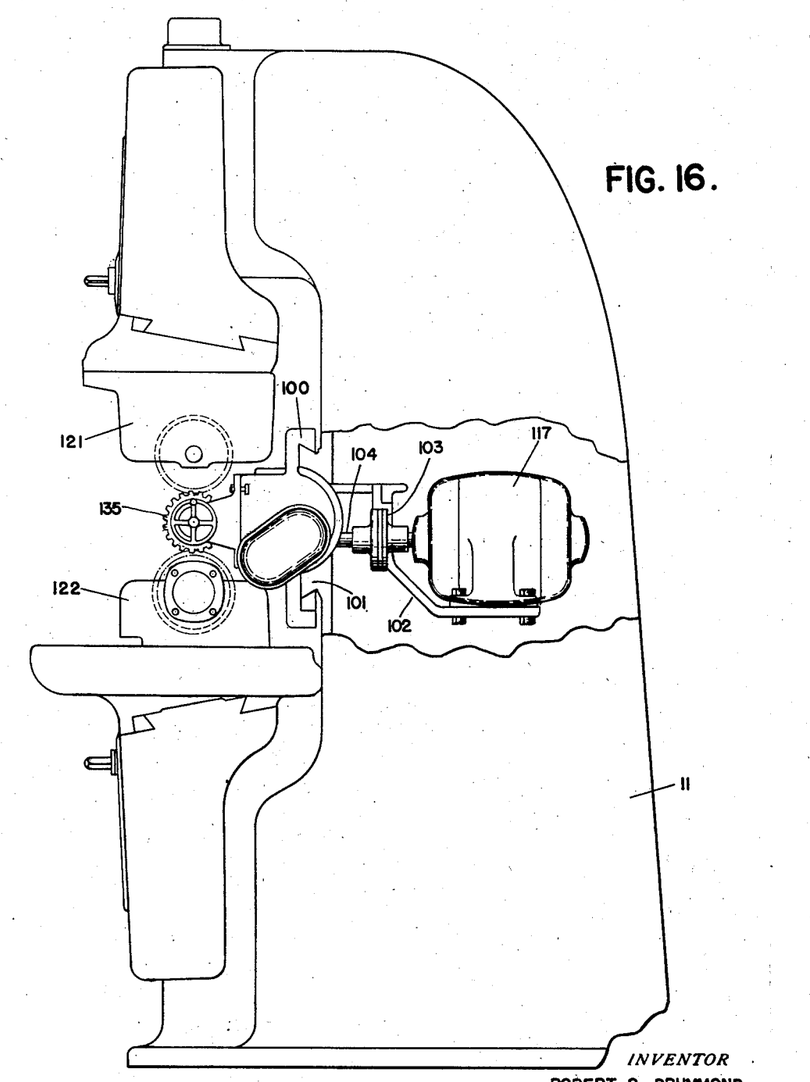
Fig. 16 is a side view of a modified form of machine.

As shown in Figure 16, a slide 100 is mounted for horizontal reciprocation on the ways 101. The slide 100 has a bracket 102 extending within the hollow frame 11 for the purpose of supporting the driving motor 117. The motor 117 drives through a coupling 103 the shaft 104 (see Figure 18) on which there is a worm 105. The worm gear 106 meshing with worm 105 is mounted on the shaft 107 journaled in bearings 108 and 109 in the frame of the slide 100. The shaft 107 serves to transmit the power of the motor both for the purpose of rotating the work gear and reciprocating the slide 100. For rotating the work gear, suitable change gears are provided in order that the speed of rotation may be predetermined. As shown, the shaft 107 has a gear 110 thereon meshing with the pinion 111 carried by the auxiliary shaft 112. The shaft also has a gear 113 which meshes with the gear 114 on the shaft 115, which latter forms the driving shaft for the work.

Figure 17:
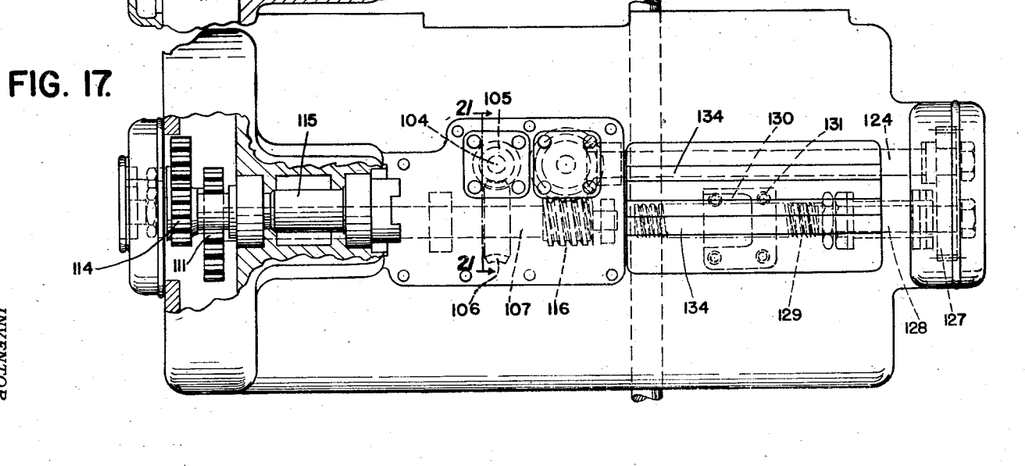
Fig. 17 is a sectional elevation of the work-carrying slide mechanism.
Figures 18, 21:
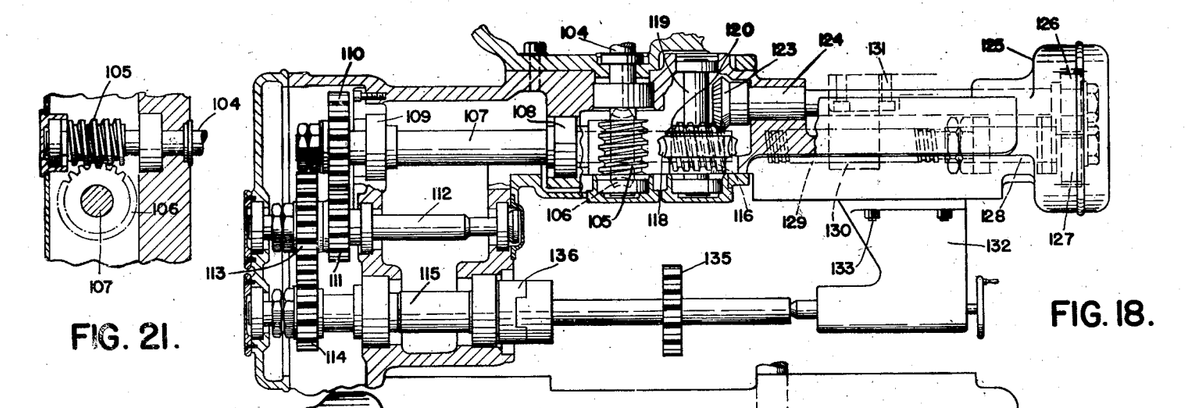
Fig. 18 is a sectional plan view of the mechanism shown in Figure 17.
Fig. 21 is a section on line 21—21 of Fig. 17.
Figures 19, 20:
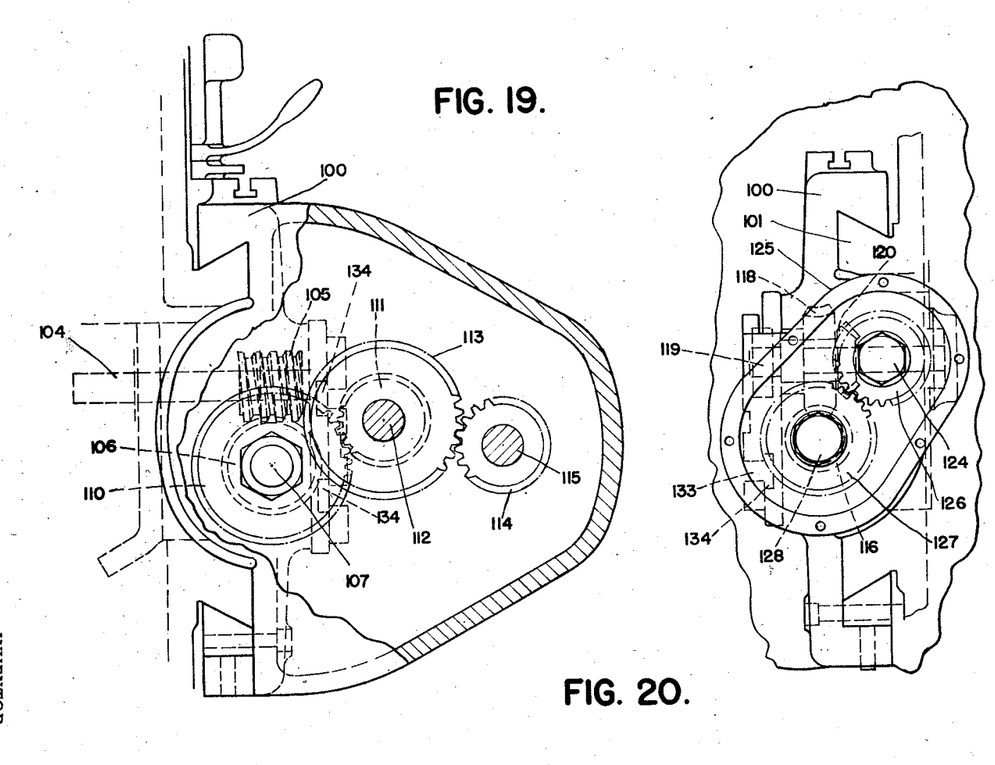
Fig. 19 is an end view of the parts shown in Fig. 18 with parts broken away.
Fig. 20 is an enlarged fragmentary side view of a portion of the drive mechanism shown in Fig. 16.

For reciprocating the slide, the shaft 107 is provided with a worm 116 which engages the worm gear 118 on a cross shaft 119. On the shaft is a beveled gear 120 meshing with the beveled gear 123 carried by the shaft 124. This shaft extends into the enlarged housing 125 at the end of the slide and has secured thereto a gear 126 which meshes with the gear 127 on the shaft 128, the latter being coaxial with the shaft 107. The shaft 128 is provided with the lead screw 129 and is suitably mounted in the slide 100 to take up end thrust. The lead screw 129 engages a nut 130 secured by bolts 131 to the frame 11 of the machine.

The slide 100 has adjustably mounted thereon the tailstock 132 which may be clamped in position by suitable bolts 133 engaging the T-slots 134. The tailstock is similar to the one previously described and carries a center in axial alignment with the driving shaft 115. The work piece 135 is adapted to be inserted between the driving coupling 136 on the shaft 115 and the tailstock 132.

In the machine as described, the rotary cutting tools are carried by the heads 121 and 122 which are adjustable in the same manner as described in connection with the machine shown in Figure 1, except that the mechanism for reciprocating the cutters is either disconnected or eliminated entirely from the machine. When the motor 117 is energized, it causes the work piece 135 to revolve, while the cutters in the heads 121 and 122 are driven by the intermeshing action of the teeth. At the same time the slide 100 is given a slow feed movement in the direction of the axis of the work gear. Suitable limit switches are provided for reversing the motor 117 after a predetermined feed movement which causes the direction of rotation of the work piece to be changed and the slide to be moved axially in the opposite direction. The action of the machine is the same in principle as the machine first described.

What I claim as my invention is:

1. A machine for finishing gears comprising a frame, a work support rotatably mounted on said frame, a plurality of tool supports carried by said frame, means for providing relative reciprocation between the tool supports and the work support, means for rotating said work support and said tool supports, and means automatically operable in timed relation to said relative reciprocation to feed said tool supports simultaneously, substantially radially toward said work support.

2. A gear finishing machine of the type disclosed comprising a frame, a work support on said frame, a tool hanger adjustable radially toward and from said work support, a tool carriage reciprocable on said hanger in a plane parallel to the axis of said work support, a motor carried by said carriage for reciprocating said carriage, a tool head carried by said carriage and adjustable about an axis generally radially disposed to the axis of said work support, a rotary tool support carried by said tool head, and drive means including a clutch for connecting said motor to rotate said tool support in any position of adjustment of said tool head.

3. A gear finishing machine comprising a work carriage slidably mounted for reciprocation, a work arbor rotatably carried thereby, a motor on said carriage, transmission means between said motor and work arbor for rotating said work arbor from said motor, and other transmission means driven by said motor for translating said carriage, a plurality of tool arbors disposed radially of said work arbor and adjustable in feeding relation radially of said work arbor, and means responsive to translation of said work carriage for simultaneously feeding said tool arbors radially toward said work arbor.

4. A gear finishing machine comprising a work carriage slidably mounted for reciprocation, a work arbor rotatably carried thereby, a motor on said carriage, transmission means between said motor and work arbor for rotating said work arbor from said motor, and other transmission means driven by said motor for translating said carriage, a plurality of tool arbors disposed radially of said work arbor and adjustable in feeding relation radially of said work arbor, said tool arbors adapted to support gear like finishing tools in mesh at limited crossed axes with a gear carried by said work arbor, and means responsive to translation of said work carriage for simultaneously feeding said tool arbors radially toward said work arbor, substantially at the end of a translation of said work carriage.

5. A gear finishing machine comprising a work carriage slidably mounted for reciprocation, a work arbor rotatably carried thereby, a motor on said carriage, transmission means between said motor and work arbor for rotating said work arbor from said motor, and other transmission means driven by said motor for translating said carriage, a plurality of tool arbors disposed radially of said work arbor and adjustable in feeding relation radially of said work arbor, and means responsive to translation of said work carriage for simultaneously feeding said tool arbors radially toward said work arbor, said last means comprising a cam device for each tool arbor, and a single motor having driving connection with each of said cam devices.

6. A machine for finishing gears comprising a frame, a work support rotatably mounted on said frame, a plurality of tool supports carried by said frame, means for providing relative reciprocation between the tool supports and the work support in a direction parallel to the axis of said work support, means for rotating said work support and said tool supports, and means automatically operable in timed relation to said relative reciprocation to feed said tool supports simultaneously, substantially radially toward said work support.

7. A machine for finishing gears comprising a frame, a work support rotatably mounted on said frame, a plurality of tool supports carried by said frame, means for providing relative reciprocation between the tool supports and the work support in a direction parallel to the axis of said work support, means for rotating said work support and said tool supports, and means automatically operable in timed relation to said relative reciprocation to feed said tool supports simultaneously, substantially radially toward said work support, said feed taking place substantially at the end of a stroke of said relative reciprocation.

ROBERT S. DRUMMOND.